United States Patent
Kaukewitsch et al.

(10) Patent No.: US 12,265,363 B2
(45) Date of Patent: Apr. 1, 2025

(54) CONTROLLING AN OPERATION OF A TECHNICAL SYSTEM AUTOMATICALLY

(71) Applicant: Siemens Aktiengesellschaft, Munich (DE)

(72) Inventors: Christof Kaukewitsch, Munich (DE); Marc Zeller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 690 days.

(21) Appl. No.: 17/411,110

(22) Filed: Aug. 25, 2021

(65) Prior Publication Data
US 2022/0066403 A1 Mar. 3, 2022

(30) Foreign Application Priority Data

Aug. 31, 2020 (EP) .................................. 20193666

(51) Int. Cl.
*G05B 13/04* (2006.01)
*G06F 30/20* (2020.01)
(Continued)

(52) U.S. Cl.
CPC .......... *G05B 13/042* (2013.01); *G06F 30/20* (2020.01); *H04L 9/0825* (2013.01); *G06F 2119/02* (2020.01); *H04L 9/50* (2022.05)

(58) Field of Classification Search
CPC .............. G05B 13/042; G05B 23/0286; G05B 23/0248; G05B 23/0278;
(Continued)

(56) References Cited

U.S. PATENT DOCUMENTS 6,983,227 B1 * 1/2006 Thalhammer-Reyero ................... G16B 50/20 703/2
7,516,025 B1 * 4/2009 Williams ........... G05B 23/0278 702/182

(Continued)

FOREIGN PATENT DOCUMENTS

EP 3470944 A1 4/2019
WO WO 2009042581 A1 4/2009

OTHER PUBLICATIONS

Avizienis et al., "Basic Concepts and Taxonomy of Dependable and Secure Computing", Mar. 2004, IEEE Transactions on Dependable and Secure Computing, vol. 1, No. 1, pp. 11-23 (Year: 2004).*

(Continued)

*Primary Examiner* — Nicholas Klicos
(74) *Attorney, Agent, or Firm* — Schmeiser, Olsen & Watts, LLP

(57) ABSTRACT

Provided is a computer-implemented method for controlling an operation of a technical system automatically, including at least the steps of: acquiring information about a modified configuration of at least one sub-system included in the technical system; generating a virtual model of the technical system including the at least one sub-system with the modified configuration for an evaluation of the operation; adjusting the virtual model to provide a control instruction for the operation of the technical system, wherein the adjusted virtual model is configured to compare an evaluation value acquired from the evaluation with a target requirement in a cryptographic and to derive the control instruction based on the comparison; and controlling the operation of the technical system based on the control instruction.

16 Claims, 2 Drawing Sheets

(51) Int. Cl.
*G06F 119/02* (2020.01)
*H04L 9/00* (2022.01)
*H04L 9/08* (2006.01)

(58) Field of Classification Search
CPC ........... G05B 2219/23447; G05B 2219/24087; G05B 2219/35227; H04L 9/0825; H04L 9/50; G06F 30/20; G06F 21/57; G06F 21/64; G06F 2119/02
See application file for complete search history.

(56) References Cited

U.S. PATENT DOCUMENTS

| | | | | |
|---|---|---|---|---|
| 2009/0299713 | A1* | 12/2009 | Miller | G05B 23/0281 706/46 |
| 2014/0129000 | A1* | 5/2014 | Block | G06F 11/008 700/79 |
| 2016/0357895 | A1* | 12/2016 | Hyde | G06N 7/01 |
| 2017/0262818 | A1* | 9/2017 | Horrell | G06Q 10/067 |
| 2017/0316125 | A1* | 11/2017 | Jacobson | G06F 16/254 |
| 2018/0257683 | A1* | 9/2018 | Govindappa | B61L 27/57 |
| 2018/0357334 | A1* | 12/2018 | Chao | G06F 16/10 |
| 2019/0033842 | A1* | 1/2019 | Ceschini | G06F 11/3447 |
| 2019/0033850 | A1* | 1/2019 | B R | G05B 9/02 |
| 2019/0108084 | A1* | 4/2019 | Hipp | G05B 23/0278 |
| 2019/0176862 | A1* | 6/2019 | Kumar | B61L 27/40 |
| 2019/0339688 | A1* | 11/2019 | Cella | H04L 1/18 |
| 2019/0340269 | A1* | 11/2019 | Biernat | H04L 63/12 |
| 2020/0310394 | A1* | 10/2020 | Wouhaybi | H04L 41/0895 |

OTHER PUBLICATIONS

Liggesmeyer P.et al.: "Improving system reliability with automatic fault tree generation"; Fault-Tolerant Computing; 1998. Digest of Papers. Twenty-Eighth Annual International Symposium on Munich; Germany; Jun. 23-25, 1998;Los Alamitos; CA; USA; IEEE Comput. Soc; US; Jun. 23, 1998; pp. 90-99; XP032146623; DOI: 10.1109/FTCS.1998.689458; ISBN: 978-0-8186-8470-8.

Kaukewitsch, Christof et al : "Automatic Generation of RAMS Analyses from Model-based Functional Descriptions using UML State Machines"; 2020 Annual Reliability and Maintainability Symposium (RAMS); IEEE; Jan. 27, 2020; pp. 1-6; XP033801205; DOI: 10.1109/RAMS48030.2020.9153667.

Extended European Search Report dated Feb. 22, 2021 for Application No. 20193666.3.

* cited by examiner

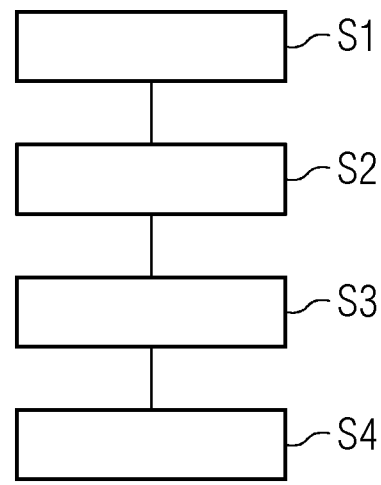
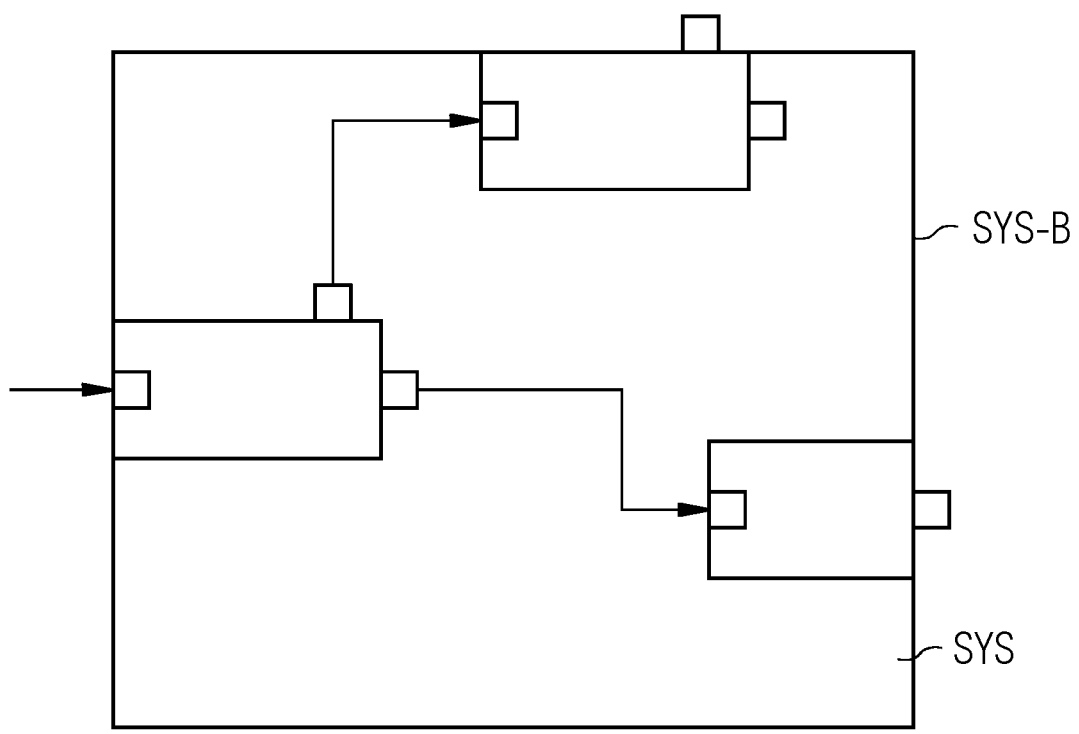

CONTROLLING AN OPERATION OF A TECHNICAL SYSTEM AUTOMATICALLY

CROSS-REFERENCE TO RELATED APPLICATIONS

This application claims priority to European Application No. 20193666.3, having a filing date of Aug. 31, 2020, the entire contents of which are hereby incorporated by reference.

FIELD OF TECHNOLOGY

The following relates to controlling the operation of technical system automatically based on a verification result.

BACKGROUND

Technical systems need to verifiably fulfill functional as well as non-functional requirements such as RAMS (Reliability, Availability, Maintainability and Safety) requirements. In case of modified functionality as well as in case of system components or sub systems to be replaced by new or different ones the fulfillment of these functional requirements and/or non-functional requirement (for example, RAMS requirements) still must be reassured.

Dynamically reconfiguring adaptable systems pose considerable challenges with regard to requirements' fulfillment. Despite changing system configuration and/or functionality it needs to be guaranteed that these systems operate according to their functional and non-functional requirements including RAMS targets. Cyber-Physical-Systems (CPS) such as smart grids pose specifically high challenges in this respect due to their adaptability and complexity. A CPS is commonly defined as a computer system in which a mechanism is controlled or monitored by computer-based algorithms.

The typical approach here has been to involve human experts to assess a new system configuration, to verify and document that the requested requirements are met and to agree on the results with other parties involved, e.g. with Notified Bodies. This may comprise the generation of Failure Modes and Effects Analyses (FMEA), fault tree and/or Markov analyses.

The problem has also been solved by human experts pre-assessing and pre-determining allowable system configurations and functionality and only permitting operation accordingly. Aberrant or simply not pre-evaluated configurations do not get permission to operate which may leave actually acceptable or new system configurations or functionalities out.

An example of the procedure above is related to safety-critical applications. Under Safety-Related Application Conditions (SRACs) the exchangeability of SIL (Safety Integrity Level) certified hardware or components is supported. Under changed conditions or applications scenarios this approach is however problematic since SIL is related to a safety function not to hardware.

In sufficiently standardized environments technologies such as Component Fault Trees (CFT) [P. Liggesmeyer and M. Rothfelder, "Improving System Reliability with Automatic Fault Tree Generation," in Proceedings of the 28th Annual International Symposium on Fault-Tolerant Computing, 1998.] can also be supportive to automate RAMS requirements evaluation.

Regarding complex systems such as CPS however it becomes obvious that it is not possible to foresee the entire scope of potential applications with different functionalities and system configurations, not to mention the integration of future components with at present still unknown properties.

Significant time delay and additional costs are typically required if RAMS analyses are carried out by human experts. For dynamically changing applications and configurations operation may prove eventually uneconomical without automated support.

SUMMARY

An aspect relates to a method and system for controlling an operation of a technical system automatically.

Accordingly, a computer-implemented method for controlling an operation of a technical system automatically is provided, comprising at least the steps of:
  acquiring information about a modified configuration of at least one sub-system included in the technical system;
  generating a virtual model of the technical system including the at least one sub-system with the modified configuration for an evaluation of the operation;
  adjusting the virtual model to provide a control instruction for the operation of the technical system, wherein the adjusted virtual model is configured to compare an evaluation value acquired from the evaluation with a target requirement in a cryptographic environment and to derive the control instruction based on the comparison; and controlling the operation of the technical system based on the control instruction.

In some advantageous embodiments, variants, or refinements of embodiments, the control instruction instructs whether to stop or continue the operation of the technical system.

In some advantageous embodiments, variants, or refinements of embodiments, the control instruction further includes restriction information to operate the technical system under a restricted condition.

In some advantageous embodiments, variants, or refinements of embodiments, the restricted condition indicates a limited speed of the operation for the technical system.

In some advantageous embodiments, variants, or refinements of embodiments, wherein the evaluation for the operation is at least one of a Fault Tree Analysis, FTA, a Reliability, Availability, Maintainability, and Safety analysis, RAMS analysis, a Failure Mode and Effects Analysis, FMEA.

In some advantageous embodiments, variants, or refinements of embodiments, the evaluation value is a table acquired in the cryptographic environment from at least one of the FTA, RAMS analysis and the FMEA.

In some advantageous embodiments, variants, or refinements of embodiments, the target requirement includes a plurality of target values regarding the performance of the technical system including the at least one sub-system with the modified configuration.

In some advantageous embodiments, variants, or refinements of embodiments, the control instruction instructs to continue the operation of the technical system, if all of the target values are achieved by the evaluation.

In some advantageous embodiments, variants, or refinements of embodiments, the target requirement is defined by a RAMS model.

In some advantageous embodiments, variants, or refinements of embodiments, the evaluation value is provided to an authorized user associated with the evaluation with at least one of a public key and a private key.

In some advantageous embodiments, variants, or refinements of embodiments, the virtual model is encrypted based on a smart contract by using a blockchain technology.

In some advantageous embodiments, variants, or refinements of embodiments, the virtual model is generated based on a plurality of Internet-of-Things (IoT) devices with accumulated data regarding the at least one sub-system.

Embodiments of the invention also provide, according to a second aspect, an apparatus configured to perform the method according to any embodiment of the first aspect of embodiments of the present invention. The apparatus may in particular comprise an input interface, a computing device and an output interface.

The computing device may be realized in hardware, such as a circuit or a printed circuit board and/or comprising transistors, logic gates and other circuitry. Additionally, the computing device may be at least partially realized in terms of software. Accordingly, the computing device may comprise, or be operatively coupled to, a processor (one or more CPUs and/or one or more GPUs and/or one or more ASICs and/or one or more FPGAs), a working memory and a non-transitory memory storing a software or a firmware that is executed by the processor to perform the functions of the computing device. Signals may be received by the input interface and signals that the processor of the computing device creates may be outputted by the output interface. The computing device may be implemented, at least partially, as a microcontroller, an ASIC, an FPGA and so on.

Embodiments of the invention further provide, according to a third aspect, a non-transitory computer-readable data storage medium comprising executable program code configured to, when executed by a computing device, perform the method according to any embodiment of the first aspect.

Embodiments of the invention further provide, according to a fourth aspect, a computer program product (non-transitory computer readable storage medium having instructions, which when executed by a processor, perform actions) comprising executable program code configured to, when executed by a computing device, perform the method according to any embodiment of the first aspect.

Embodiments of the invention further provide, according to a fifth aspect, a data stream comprising, or configured to generate, executable program code configured to, when executed by a computing device, perform the method according to any embodiment of the first aspect.

BRIEF DESCRIPTION

Some of the embodiments will be described in detail, with references to the following Figures, wherein like designations denote like members, wherein:

FIG. 1 shows a schematic flow diagram illustrating a computer-implemented method according to the first aspect of embodiments of the present invention;

FIG. 2 shows a block diagram schematically illustrating a structure of a system according to the first aspect of embodiments of the present invention;

DETAILED DESCRIPTION

Figure 3:
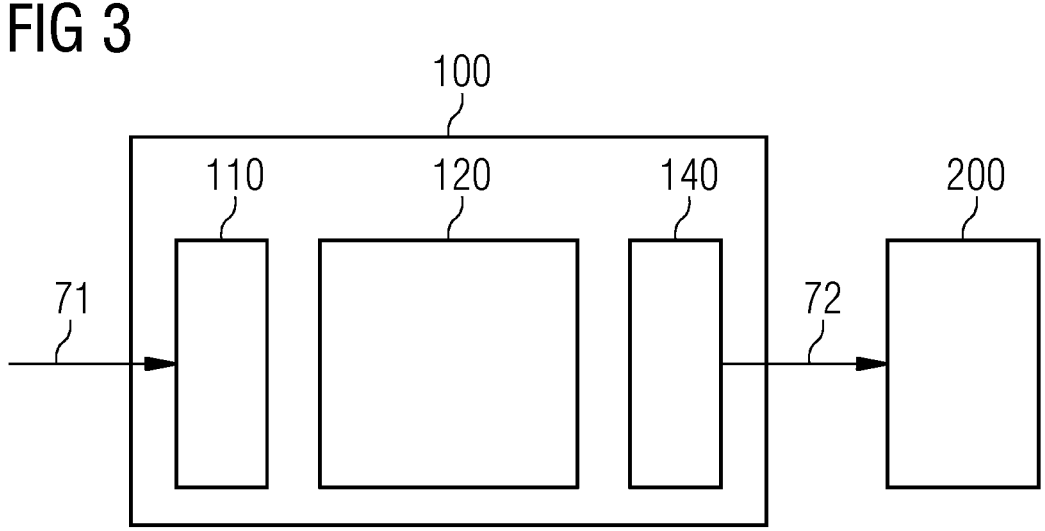
FIG. 3 shows a block diagram schematically illustrating an apparatus according to an embodiment of the second aspect of embodiments of the present invention.

Although specific embodiments have been illustrated and described herein, it will be appreciated by those of ordinary skill in the art that a variety of alternate and/or equivalent implementations may be substituted for the specific embodiments shown and described without departing from the scope of embodiments of the present invention. Generally, this application is intended to cover any adaptations or variations of the specific embodiments discussed herein.

The term "digital twin" is a digital replica of a living or non-living physical entity. Digital twin refers to a digital replica of potential and actual physical assets (physical twin), processes, people, places, systems and devices.

The term "functional requirement" is a function of a system or its component (sub-system), where a function is described as a specification of behavior between outputs and inputs. Functional requirements may involve calculations, technical details, data manipulation and processing, and other specific functionality that define what a system is supposed to accomplish.

The term "non-functional requirement" is a requirement that specifies criteria that can be used to judge the operation of a system, rather than specific behaviors. Non-functional requirements may be defined as quantitative requirements.

Broadly, functional requirements define what a system is supposed to do and non-functional requirements define how a system is supposed to be. Functional requirements are usually in the form of "system shall do <requirement>", an individual action or part of the system, perhaps explicitly in the sense of a mathematical function, a black box description input, output, process and control functional model or input-output (IPO) Model. In contrast, non-functional requirements may be defined as quantitative requirements. That is, non-functional requirements are in the form of "system shall be <requirement>", an overall property of the system as a whole or of a particular aspect and not a specific function. The system's overall properties commonly mark the difference between whether the development project has succeeded or failed.

The term "RAMS" is an acronym for "Reliability, Availability, Maintainability, and Safety", commonly used in engineering to characterize a product or system. Reliability means ability to perform a specific function and may be given as design reliability or operational reliability.

Availability means ability to keep a functioning state in the given environment. Maintainability means ability to be timely and easily maintained (including servicing, inspection and check, repair and/or modification). Safety means ability not to harm people, the environment, or any assets during a whole life cycle.

The term "fault tree analysis (FTA)" is a top-down, deductive failure analysis in which an undesired state of a system is analyzed using Boolean logic to combine a series of lower-level events. This analysis method is mainly used in safety engineering and reliability engineering to understand how systems can fail, to identify the best ways to reduce risk and to determine (or get a feeling for) event rates of a safety accident or a particular system level (functional) failure.

The term "failure modes and effects analysis (FMEA)", which is often written with "failure modes" in plural, is the process of reviewing as many components, assemblies, and subsystems as possible to identify potential failure modes in a system and their causes and effects. For each component, the failure modes and their resulting effects on the rest of the system are recorded in a specific FMEA worksheet. There are numerous variations of such worksheets. An FMEA can be a qualitative analysis, but may be put on a quantitative basis when mathematical failure rate models are combined with a statistical failure mode ratio database. There exist a few extensions of FMEA, for example, FMEDA and FMECA. FMEDA (failure modes, effects, and diagnostic analysis) is a systematic analysis technique to obtain sub-system/product level failure rates, failure modes and diagnostic capability. FMECA (failure mode, effects and criticality analysis) extends FMEA by including a criticality analysis, which is used to chart the probability of failure modes against the severity of their consequences.

The term "block chain", originally block chain, is a growing list of records (called blocks) that are linked by using cryptography. Each block contains a cryptographic hash of the previous block, a timestamp, and transaction data. By design, a blockchain is resistant to modification of the data. It is "an open, distributed ledger that can record transactions between two parties efficiently and in a verifiable and permanent way".

The term "smart contract" is digital entities that define complex transaction logic and facilitate cross-organizational workflow including, but not limited to, storage of data, data access permissions, ordered workflow and computation. Digital entities may define complex transaction logic and facilitate cross-organizational workflow including, but not limited to, storage of data, data access permissions, ordered workflow and computation. In the cryptocurrency space, smart contracts are digitally signed in the same way a cryptocurrency transaction is signed. Additionally, the programming languages with various degrees of Turing-completeness as a built-in feature of a blockchain make the creation of custom sophisticated logic possible.

The term "digital signature" is a mathematical scheme for verifying the authenticity of digital messages or documents. A valid digital signature, where the prerequisites are satisfied, gives a recipient very strong reason to believe that the message was created by a known sender (authentication), and that the message was not altered in transit (integrity). The signing keys are held in a crypto wallet.

The term "security protocol" (cryptographic protocol or encryption protocol) is an abstract or concrete protocol that performs a security-related function and applies cryptographic methods, often as sequences of cryptographic primitives. A protocol describes how the algorithms should be used. A sufficiently detailed protocol includes details about data structures and representations, at which point it can be used to implement multiple, interoperable versions of a program.

The term "cyber-physical system (CPS)" is a computer system in which a mechanism is controlled or monitored by computer-based algorithms. In cyber-physical systems, physical and software components are deeply intertwined, able to operate on different spatial and temporal scales, exhibit multiple and distinct behavioral modalities, and interact with each other in ways that change with context. Examples of CPS include smart grid, autonomous automobile systems, medical monitoring, industrial control systems, robotics systems, and automatic pilot avionics.

CPS involves transdisciplinary approaches, merging theory of cybernetics, mechatronics, design and process science. The process control is often referred to as embedded systems. In embedded systems, the emphasis tends to be more on the computational elements, and less on an intense link between the computational and physical elements. CPS is also similar to the Internet of Things (IoT), sharing the same basic architecture; nevertheless, CPS presents a higher combination and coordination between physical and computational elements.

FIG. 1 shows a schematic flow diagram illustrating a computer-implemented method according to the first aspect of embodiments of the present invention, i.e. a computer-implemented method for automatic control of an operation performed by a technical system. The procedures described in FIG. 1 may be controlled by software, an apparatus, a computer program product or a non-transitory computer-readable data storage medium. The software may be partially published or published to all parties involved in a verification of the technical system. Possibly further types of software disclosure may also be valuable.

In step S1, information about modified configuration of at least one sub-system included in the technical system may be acquired.

The modified configuration may indicate a change of the at least one sub-system. That is, the modified configuration may be occurred in accordance with the change of the sub-system. The information about modified configuration may include identification of corresponding sub-system. The information about modified configuration may include detailed information of modified configuration. If the sub-system is changed from one to another, the information of modified configuration may include identification of new sub-system.

The sub-system may be a component which forms the technical system. The technical system may be also referred to as a system, a whole system, or investigated system. The sub-system may be a software component or a hardware component. The sub-system may be also referred to as a component, or one assembly of the whole system.

The sub-system may be configured with at least one input (port) and at least one output (port). The different sub-systems may be connected via their inputs and the outputs. For example, a first sub-system, a second sub-system, and a third sub-system may be included in the technical system. An input of the first sub-system is an input of the technical system, an output of the first sub-system is connected to an input of the second sub-system, an output of the second sub-system is connected to an input of the third sub-system, and an output third sub-system is an output of the technical system. The operation of the system may be performed based on interactions between the at least one sub-system and the other sub-system via at least one input and/or at least one output.

Each sub-system is configured with its own characteristic. For example, each of the sub-systems has its own relationship between an input and an output. Thus, an operation of a sub-system may be defined by the relationship between the input and the output. The relationship between the input and the output may be also referred to as 'functional description'.

The information about modified configuration may be identified by user. Or, the information about modified configuration may be identified by the software automatically. In this case, the software may be equipped with devices to recognize the modification of configuration.

In step S2, a virtual model of the technical system is generated, when the information is acquired. The technical system includes the at least one sub-system with the modified configuration.

The virtual model may be built based on a digital twin of at least one sub-system. Alternatively, the virtual model may be a cyber-physical system. Thus, the performance of the at least one sub-system may be verified by a virtual model of the corresponding sub-system(s).

The virtual model may be generated based on a plurality of sensors with accumulated data regarding the at least one sub-system. In more detail, the virtual model may be generated based on data acquired by Internet of things (IoT) devices associated with corresponding sub-system.

The IoT devices may identify each other and collect data from the identified IoT devices. Furthermore, the virtual model may be generated automatically by using the IoT devices.

The virtual model may be implemented by at least one of a Unified Modeling Language (UML), a Systems Modeling Language (SysML), or any other modelling language. The Unified Modeling Language (UML) is a general-purpose, developmental, modeling language in the field of software engineering that is intended to provide a standard way to visualize/describe the design of a system. The UML may be implemented by a supplier of each of sub-systems. SysML is a general-purpose modeling language for systems engineering applications. SysML supports the specification, analysis, design, verification and validation of a broad range of systems and systems-of-systems.

In step S3, virtual model is adjusted to provide a control instruction for the operation of the technical system. The adjusted virtual model may be configured to compare an evaluation value acquired from the evaluation with a target requirement in a cryptographic environment and to derive the control instruction based on the comparison.

The evaluation (or verification) may be a process for evaluating performance for an operation of at least one sub-system, several sub-systems or the entire technical system.

The evaluation procedure may be performed on at least one functional requirement or non-functional requirement. That is, the evaluation may be to determine whether functional requirements and/or non-functional requirements of the at least one sub-system are reached for the operation of the technical system. Definitions of functional requirements and non-functional requirements are already introduced above. For example, the non-functional (quantitative) requirement may be verified by RAMS analysis.

The evaluation may be performed based on at least one of a Fault Tree Analysis (FTA), a Failure Mode and Effects Analysis (FMEA), a Failure Modes, Effects, and Diagnostic Analysis (FMEDA) and a Failure Mode, Effects and Criticality Analysis (FMECA). The evaluation value may be a table acquired in the cryptographic environment from at least one of the FTA, RAMS analysis, the FMEA, the FMEDA or FMECA. The evaluation value may be acquired in a cryptographic environment.

A FMEA is an inductive reasoning (e.g., forward logic) single point of failure analysis for safety critical systems. Failure mode and effects analysis are available in different variations for different applications, such as software or processes. Failure mode and effects analysis may be either qualitative or quantitative. The variations analyze failure modes of elements and the effects of the failure modes on the analyzed system. A generic quantified FMEA is described for a domain independent application of electrical/electronic/programmable electronic systems in the International Standard IEC 61508. Without the quantifications, the FMEA described therein is also generic for the qualitative variation of the analysis. There exist a few extensions of FMEA, for example, FMEDA and FMECA. FMEDA (Failure Modes, Effects, and Diagnostic Analysis) is a systematic analysis technique to obtain subsystem/product level failure rates, failure modes and diagnostic capability. FMECA (Failure Mode, Effects and Criticality Analysis) extends FMEA by including a criticality analysis, which is used to chart the probability of failure modes against the severity of their consequences.

The target requirement may be defined by at least one of FTA model, RAMS model, or FMEA Risk Priority Numbers or related targets. Typically, there are FMEA/FMEDA/FMECA tables.

For instance, for FMEA, all Risk Priority Numbers (RPN) (generated by the multiplication of occurrence value*severity value*detection value) shall be under a certain threshold or that the sum of all Risk Priority Numbers shall be under another threshold etc. For example, as target requirement, quantitative and ideally adaptive RAMS targets may be defined. Quantitative targets may comprise a certain maximum failure rate, a minimum probability of survival, a minimum availability or a maximum Risk Priority Number if FMEA are concerned. The term "adaptive RAMS targets" refers to defining RAMS targets according to a mathematical function which may for instance account for fluctuating output depending on the actual system configuration in case of a production site. I.e. in case of a higher production output, adequately higher system unavailability might be acceptable depending on the specific circumstances of a production site.

According to an embodiment of the present disclosure, a target requirement may include information of time delay. Specifically, functional requirements are defined as input-output combinations on system level with additional attributes such as for instance time delay.

The target requirement may be pre-defined in the virtual model.

By comparing the evaluation value with the target requirement, control instruction may be achieved.

The control instruction may instruct whether to stop or continue the operation of the technical system (referred to as "yes/no" result). The control instruction may further include restriction information to operate the technical system under a restricted condition. The restricted condition may for instance indicate a limited speed of the operation for the technical system. For example, a control instruction may instruct to operate a train (as the technical system) under speed of 100 km/h, according to the generated control instruction. For another example, the restricted condition may indicate an operation only to drive to a next station to be repaired.

According to an embodiment of the present disclosure, the target requirement may include a plurality of target values regarding a performance of the technical system including the at least one sub-system with the modified configuration. The control instruction instructs to continue the operation of the technical system, if all of the target values are achieved by the evaluation.

The virtual model may be encrypted to conceal at least one of the evaluation values and the inner structure of the technical system including corresponding sub-system. The virtual model may be encrypted by security protocol (cryptographic protocol or encryption protocol).

The virtual model may be configured to perform the evaluation and derive the control instruction in cryptographic environment (also referred to as encrypted environment). According to an embodiment, the virtual model may be encrypted by a smart contract which is based on blockchain technology. The smart contract is a computer program or a transaction protocol which is intended to automatically execute, control or document legally relevant events and actions according to the terms of a contract or an agreement. According to an embodiment of the present disclosure, the contract or the agreement may be generated in accordance with configurations for the evaluation and generating/deriving the control instruction.

The encrypted virtual model may be configured to be provided evaluation value only to authorized users. The authorized users may be identified (or distinguished) based on at least one of a public key or a private key. In this description, the encrypted virtual model may be a virtual model in the cryptographic environment.

For more detail, there may be two techniques for encrypting information: symmetric encryption (also called secret key encryption) and asymmetric encryption (also called public key encryption). In case of symmetric encryption, one key ("shared secret") is used both for encryption and decryption, where in case of asymmetric encryption, the encryption is performed using a public key and decryption is performed using the private key. PGP combines symmetric key encryption and public-key encryption. The message is encrypted using a symmetric encryption algorithm, which requires a symmetric key. Each symmetric key is used only once and is also called a session key. The message and its session key are sent to the receiver. The session key must be sent to the receiver so they know how to decrypt the message, but to protect it during transmission, it is encrypted with the receiver's public key.

In step S4, the operation of the technical system may be controlled based on the control instructions.

For example, it may be determined whether to continue the operation of the technical system based on the control instructions. For example, operation of the technical system will be restricted by the control instruction (for example, a limited speed).

According to an embodiment of the present disclosure, the target requirement includes a plurality of target values regarding the performance of the technical system. In this case, the control instruction instructs to continue the operation of the technical system, if all of the plurality of target values are achieved by the evaluation. Thus, the operation may be continued only when all of the target values are reached by the evaluation value.

For example, in case all defined functional and non-functional RAMS targets are reached, the software may output a "permission to operate" signal as the control instruction. If this signal is invalid, system operation must suspend or immediately transition into a safe state.

Consequently, operation may be only permitted if all relevant target requirements are met. Involvement of human experts in case of changing functionality or configuration e.g. due to component type replacement is no longer required. Continuing operation after reconfiguration or functional modifications hence depends on calculation speed and no longer on human pre-determination or even human involvement.

"Permission to operate" can also be based on RAMS targets (or functional targets) alone.

An access-controlled blockchain may be used for the method according to the present disclosure. A distributed leger may be permission free or permissioned, e.g. for Notified Bodies (government organization who is responsible for homologation), to collect and verify data in case an accident with the technical system involved has occurred. The integrity of blockchain data is reassured by decentralization and encryption methods.

Supposing sufficiently standardized boundary conditions, components or sub systems the approach to generate "permission to operate" signals may likewise apply to automatic Component Fault Tree generation [P. Liggesmeyer and M. Rothfelder, "Improving System Reliability with Automatic Fault Tree Generation," in Proceedings of the 28th Annual International Symposium on Fault-Tolerant Computing, 1998.] to verify RAMS targets' achievement. In this case only a subset of the steps described above, and some modification will be required to account for the input/output failure modes in Component Fault Trees.

According to embodiments of the present disclosure, dynamically reconfiguring systems such as CPS can be evaluated regarding their functional or non-functional properties such as RAMS without human intervention and no related costs or delays. Also, System operation may be automatically permitted or inhibited according to the analyses results. Also, supposing sufficient calculation speed runtime applications for dynamically changing and non-predetermined system configurations may be supported. Also, errors due to human judgment can be avoided.

According to embodiments of the present disclosure, the development of high-quality systems is supported. Development partners can no longer hope for mild or erroneous human judgment to get permission to operate. Without achieving the specified functional or non-functional targets the system will simply not be permitted to operate which typically leads to severe contractual consequences for the parties involved.

FIG. 2 shows a block diagram schematically illustrating a structure of a system according to the first aspect of embodiments of the present invention. As shown in FIG. 2, an example of system is provided, but the structure of system according to the present disclosure is not limited therein.

As can be seen in the diagram illustrated in FIG. 2 a system SYS can comprise several components C. The components C can comprise sub components such as switches, sensors or actuators, software components to be executed by hardware components such as CPUs and embedded components comprising both hardware and embedded software to run the respective hardware component. Each component C can comprise input ports and output ports for connecting the respective component with other components of the defined and investigated system. In the illustrated exemplary system of FIG. 2, the system comprises three components C1, C2, C3. The system SYS comprises a system boundary SYS-B which comprises the interface ports of the system to other systems. In the illustrated example of FIG. 2 the first component C1 comprises an input port to receive a signal and two output ports which are connected to other components C2, C3 of the investigated system SYS. The second component C2 comprises a single input port connected to the first output port of the first component C1. The second component C2 comprises a single output port which forms an external port or interface at the system boundary SYS-B of the system. The third component C3 also comprises a single input port and a single output port. The single input port of the component C3 is connected internally to the second output port of the first component C1 as shown in FIG. 2. The output port of the third component C3 forms an external port or interface at the system boundary SYS-B of the investigated system SYS. As can be seen in FIG. 2 the system boundary SYS-B comprises in the illustrated embodiment three ports, i.e. the input port of the first component C1, the output port of the second component C2 and the output port of the third component C3. The components C within the system SYS can comprise different kinds of components C including hardware components, software components to be executed by hardware components such as CPUs and embedded components. The hardware components can comprise all analogue or digital components.

The components C, C2, C3 each have an associated machine readable functional description including the port definitions as well as component failure mode descriptions which are processed to generate automatically an analytical artifact used for development and/or analysis of the investigated technical system of interest SYS in response to at least one applied system evaluation criterion. These analytical artifacts comprise in a possible embodiment a fault tree, a Markov chain, a combination of fault tree(s) and Markov chain(s), an FMEA table, or an FMECA table, an FMEDA table. These artifacts are generated automatically on the basis of a full functional description of the system of interest SYS including a machine readable description of the failure modes of its components or sub systems. Further, the analytical artifacts can be generated for different kinds of evaluation criteria such as for instance safety, reliability, maintainability and/or availability criteria.

The different components C such as components C1, C2, C3 of the system SYS illustrated in FIG. 2 can be supplied by different suppliers which offer their technical components or sub systems with a standardized generic functional description which is machine readable. It is also possible to use a semiformal functional description with OMG SysML or AADL or EAST-ADL. The functional description does include input and output port definitions and additional information data about failure modes, their causes and corresponding failure properties, in particular failure rates, preventive and corrective maintenance activities and test-related data. In a possible embodiment each component C comprises an associated functional description. This functional description of the component C can comprise the port definitions of the input and output ports of the respective component C, all component failure modes of the component, at least one internal state of the respective component, a failure rate, maintenance activities, an inspection interval and/or a mean down time and/or a mean repair time of the component.

FIG. 3 shows an apparatus 100 according to an embodiment of the second aspect of the present invention, i.e. an apparatus for controlling an operation of technical system automatically. In particular, the apparatus 100 is configured to perform the method according to any embodiment of the first aspect of the present invention, in particular the method as described in the foregoing with respect to FIG. 1 and FIG. 2.

The apparatus 100 comprises an input interface 110 for receiving an input signal 71. The input interface 100 may be realized in hard- and/or software and may utilize wireless or wire-bound communication. For example, the input interface 110 may comprise an Ethernet adapter, an antenna, a glass fiber cable, a radio transceiver and/or the like.

The apparatus 100 further comprises a computing device 120 configured to perform the steps S1 through S4. The computing device 120 may in particular comprise one or more central processing units, CPUs, one or more graphics processing units, GPUs, one or more field-programmable gate arrays FPGAs, one or more application-specific integrated circuits, ASICs, and or the like for executing program code. The computing device 120 may also comprise a non-transitory data storage unit for storing program code and/or inputs and/or outputs as well as a working memory, e.g. RAM, and interfaces between its different components and modules.

The apparatus may further comprise an output interface 140 configured to output an output signal 72, for example as has been described with respect to step S2 in the foregoing. The output signal 72 may have the form of an electronic signal, as a control signal for a display device 200 for displaying the semantic relationship visually, as a control signal for an audio device for indicating the determined semantic relationship as audio and/or the like. Such a display device 200, audio device or any other output device may also be integrated into the apparatus 100 itself.

Figure 4:
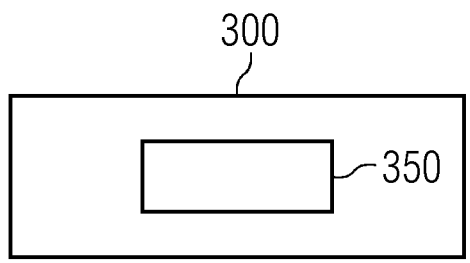
FIG. 4 shows a block diagram schematically illustrating a computer program product according to an embodiment of the third aspect of embodiments of the present invention.

FIG. 4 shows a schematic block diagram illustrating a computer program product 300 according to the third aspect of embodiments of the present invention, i.e. a computer program product 300 comprising executable program code 350 configured to, when executed (e.g. by the apparatus 100), perform the method according to the first aspect of embodiments of the present invention, in particular the method as has been described with respect to FIG. 1 and FIG. 2 in the foregoing.

Figure 5:
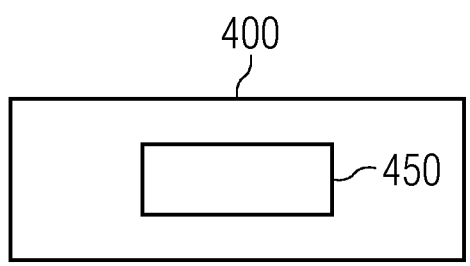
FIG. 5 shows a block diagram schematically illustrating a data storage medium according to an embodiment of the fourth aspect of embodiments of the present invention.

FIG. 5 shows a schematic block diagram illustrating a non-transitory computer-readable data storage medium 400 according to the fourth aspect of embodiments of the present invention, i.e. a data storage medium 400 comprising executable program code 450 configured to, when executed (e.g. by the apparatus 100), perform the method according to the first aspect of embodiments of the present invention, in particular the method as has been described with respect to FIG. 1 and FIG. 2 in the foregoing.

In the foregoing detailed description, various features are grouped together in the examples with the purpose of streamlining the disclosure. It is to be understood that the above description is intended to be illustrative and not restrictive. It is intended to cover all alternatives, modifications and equivalence. Many other examples will be apparent to one skilled in the art upon reviewing the above specification, taking into account the various variations, modifications and options as described or suggested in the foregoing.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for controlling an operation of a technical system automatically, comprising:
   acquiring information about a modified configuration of at least one sub-system included in the technical system;
   generating a virtual model of the technical system including the at least one sub-system with the modified configuration for an evaluation of the operation;
   adjusting the virtual model to provide a control instruction for the operation of the technical system, wherein the adjusted virtual model is configured to compare an evaluation value acquired from the evaluation with a target requirement in a cryptographic environment and to derive the control instruction based on the comparison; and
   controlling the operation of the technical system based on the control instruction, wherein the evaluation for the operation is at least one of a FTA (Fault Tree Analysis), a RAMS (Reliability, Availability, Maintainability, and Safety) analysis, and a FMEA (Failure Mode and Effects Analysis), and wherein the evaluation value is a table acquired in the cryptographic environment from the FTA and the RAMS analysis.

2. The method of claim 1, wherein the control instruction instructs whether to stop or continue the operation of the technical system.

3. The method of claim 1, wherein the control instruction further includes restriction information to operate the technical system under a restricted condition.

4. The method of claim 3, wherein the restricted condition indicates a limited speed of the operation for the technical system.

5. The method of claim 1, wherein the target requirement includes a plurality of target values regarding a performance of the technical system including the at least one sub-system with the modified configuration.

6. The method of claim 5, wherein the control instruction instructs to continue the operation of the technical system if all of the plurality of target values are achieved by the evaluation.

7. The method of claim 1, wherein the target requirement is defined by a RAMS model.

8. The method of claim 1, wherein the evaluation value is provided to an authorized user associated with the evaluation with at least one of a public key and a private key.

9. The method of claim 1, wherein the virtual model is encrypted based on a smart contract by using a blockchain technology.

10. The method of claim 1, wherein the virtual model is generated based on a plurality of Internet-of-Things devices with accumulated data regarding the at least one sub-system.

11. An apparatus configured to perform the method according to claim 1.

12. A computer program product, comprising a computer readable hardware storage device having computer readable program code stored therein, said program code executable by a processor of a computer system to implement a method comprising executable program code configured to, when executed, perform the method according to claim 1.

13. A non-transitory computer-readable data storage medium comprising executable program code configured to, when executed, perform the method according to claim 1.

14. A computer-implemented method for controlling an operation of a technical system automatically, comprising:

acquiring information about a modified configuration of at least one sub-system included in the technical system;

generating a virtual model of the technical system including the at least one sub-system with the modified configuration for an evaluation of the operation;

adjusting the virtual model to provide a control instruction for the operation of the technical system, wherein the adjusted virtual model is configured to compare an evaluation value acquired from the evaluation with a target requirement in a cryptographic environment and to derive the control instruction based on the comparison;

controlling the operation of the technical system based on the control instruction, comparing, by the adjusted virtual model, the evaluation value acquired from the evaluation with the target requirement in the cryptographic environment; and deriving, by the adjusted virtual model, the control instruction based on the comparison.

15. The method of claim 14, wherein the control instruction instructs whether to stop or continue the operation of the technical system.

16. The method of claim 14, wherein the control instruction further includes restriction information to operate the technical system under a restricted condition.

* * * * *